US010291957B2

(12) United States Patent
Dhaipule

(10) Patent No.: US 10,291,957 B2
(45) Date of Patent: May 14, 2019

(54) QUICKER IPTV CHANNEL WITH STATIC GROUP ON IGMP LOOPBACK INTERFACE

(71) Applicant: Telefonaktiebolaget L M Ericsson (publ), Stockholm (SE)

(72) Inventor: Chiranjeevi Ramana Rao Dhaipule, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 14/720,226

(22) Filed: May 22, 2015

(65) Prior Publication Data
US 2016/0345054 A1 Nov. 24, 2016

(51) Int. Cl.
*H04N 21/438* (2011.01)
*H04N 21/6405* (2011.01)
*H04L 29/06* (2006.01)
*H04N 21/643* (2011.01)
*H04N 21/647* (2011.01)

(52) U.S. Cl.
CPC ..... *H04N 21/4384* (2013.01); *H04L 65/4076* (2013.01); *H04N 21/6405* (2013.01); *H04N 21/64322* (2013.01); *H04N 21/64738* (2013.01)

(58) Field of Classification Search
CPC ........... H04N 21/4384; H04N 21/6405; H04N 21/64322; H04N 21/64378; H04L 65/4076
See application file for complete search history.

(56) References Cited

U.S. PATENT DOCUMENTS

| 8,675,653 B2 * | 3/2014 | Rokui | H04L 12/185 |
| | | | 370/390 |
| 2004/0088430 A1 * | 5/2004 | Busi | H04L 45/16 |
| | | | 709/238 |
| 2006/0291444 A1 * | 12/2006 | Alvarez | H04L 45/00 |
| | | | 370/351 |
| 2008/0134269 A1 * | 6/2008 | Sim | H04N 7/17318 |
| | | | 725/114 |
| 2009/0147786 A1 * | 6/2009 | Li | H04L 12/185 |
| | | | 370/390 |

(Continued)

FOREIGN PATENT DOCUMENTS

| EP | 2034731 A1 | 3/2009 |
| WO | 2008029230 A2 | 3/2008 |

(Continued)

OTHER PUBLICATIONS

Singer, et al., "Fast Channel Changing in RTP", 3GPP Draft TD00096, Internet Streaming Media Alliance, Oct. 2006, pp. 1-10.

*Primary Examiner* — Michael A Keller
*Assistant Examiner* — Jsing Forng Lin
(74) *Attorney, Agent, or Firm* — Sage Patent Group

(57) ABSTRACT

A method is implemented by a network device for providing a quick change Internet Protocol television (IPTV) service with reduced delay for transitioning to quick change IPTV channels by configuring a multicast address of the IPTV channel to a static group. The static group is assigned to a loopback interface of the network device. The method includes receiving multicast data traffic for a multicast group of a quick change IPTV channel identified by the static group assigned to the loopback interface, and discarding the multicast data traffic for the multicast group of the quick change IPTV channel.

12 Claims, 6 Drawing Sheets

(56) References Cited

U.S. PATENT DOCUMENTS

| | | | | |
|---|---|---|---|---|
| 2010/0260178 | A1* | 10/2010 | Huang | H04L 12/18 370/390 |
| 2011/0075663 | A1* | 3/2011 | Serbest | H04L 12/18 370/390 |
| 2012/0051358 | A1* | 3/2012 | Bellagamba | H04L 12/185 370/390 |
| 2012/0084826 | A1* | 4/2012 | Xu | H04N 7/17318 725/109 |
| 2015/0143368 | A1* | 5/2015 | Bugenhagen | G06F 9/45558 718/1 |
| 2015/0372827 | A1* | 12/2015 | Dong | H04L 12/18 370/216 |
| 2016/0241911 | A1* | 8/2016 | Shah | H04N 21/454 |
| 2016/0315876 | A1* | 10/2016 | Sinha | H04L 47/828 |

FOREIGN PATENT DOCUMENTS

| | | | | |
|---|---|---|---|---|
| WO | 2008076023 A1 | 6/2008 | | |
| WO | WO 2009146622 A1 * | 12/2009 | | H04L 45/00 |

* cited by examiner

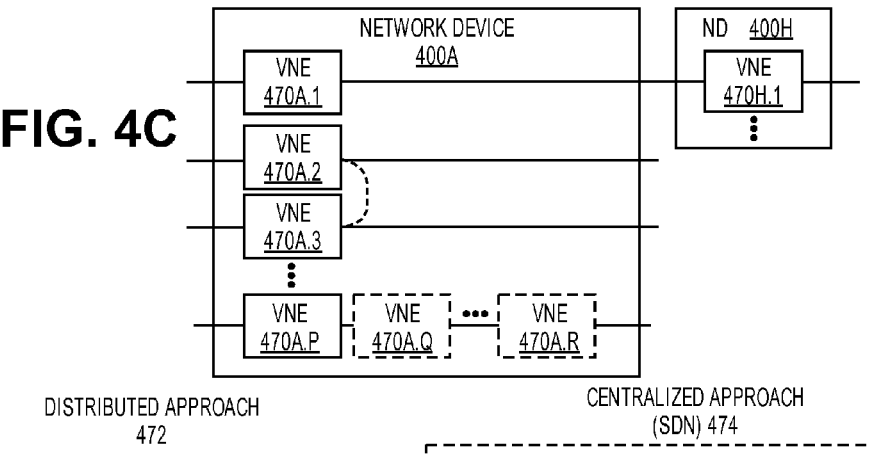
FIG. 4C
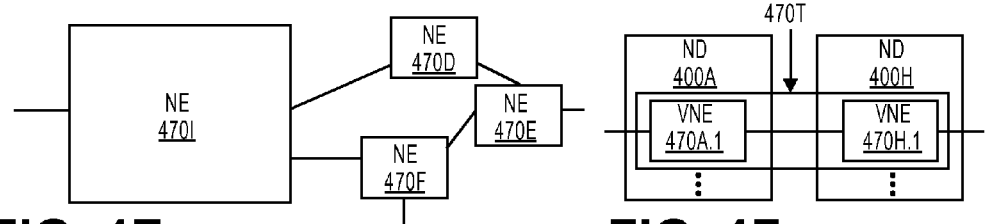
FIG. 4D
FIG. 4E
FIG. 4F

QUICKER IPTV CHANNEL WITH STATIC GROUP ON IGMP LOOPBACK INTERFACE

FIELD

Embodiments of the invention relate to providing a faster transition between Internet Protocol television (IPTV) channels via a set top box or IPTV. The IPTV channel transition process establishes a set of channels as quick change channels that have associated multicast group addresses associated at a local edge router with a static group assigned to a loopback interface of the local edge router.

BACKGROUND

IPTV is a technology that provides television content over a packet switched network using the Internet Protocol. The network providing the television content can be a local area network, the Internet or any subnet. IPTV is a streaming format where a set of IPTV sources provide the IPTV content over the IPTV network to a set of subscribers using multicast streaming protocols. IPTV television content can include live television channels, time shifted television content, video on demand services and similar content. Any number of IPTV sources can provide the IPTV content over the IPTV network to any number of subscribers.

The Internet Group Management Protocol (IGMP) is an Internet protocol that is used by IPTV subscribers to join or leave a multicast group associated with an IPTV channel provided by an IPTV source. Group membership is established by use of membership reports and leave messages. This protocol defines membership report messages that function as join requests and leave messages and processes by which a subscriber can request that an IPTV channel be sent to the subscriber (membership report message) or to end the transmission of the IPTV channel to the subscriber (leave message).

The IGMP messages are generated by a set top box, an IPTV or similar client application associated with a subscriber. These messages can be generated in response to user input such as channel selection input through the set top box or the IPTV itself. The IGMP messages are sent toward an IPTV source connected to the set top box or IPTV via a multicast network or similar network. The IGMP message is initially processed by an edge router of this multicast network. The edge router runs a multicast routing protocol and maintains a set of multicast group membership lists. The multicast routing protocol communicates with the multicast network to promulgate the information to establish a multicast tree from the IPTV source to each of the edge routers that service subscribing set top boxes and IPTVs for each multicast group where each multicast group corresponds to an IPTV source and channel.

A loopback interface is a virtual interface that can be configured on a router. The loopback interface is not connected to any other device and is a virtual interface rather than a physical interface. Any forwarding associated with such a loopback interface is dropped at the router.

SUMMARY

A method is implemented by a network device for providing a quick change Internet Protocol television (IPTV) service with reduced delay for transitioning to quick change IPTV channels by configuring a multicast address of the IPTV channel to a static group. The static group is assigned to a loopback interface of the network device. The method includes receiving multicast data traffic for a multicast group of a quick change IPTV channel identified by the static group assigned to the loopback interface, and discarding the multicast data traffic for the multicast group of the quick change IPTV channel.

In another embodiment, a network device provides a quick change Internet Protocol television (IPTV) service with reduced delay for transitioning to quick change IPTV channels by configuring a multicast address of the IPTV channel to a static group. The static group is assigned to a loopback interface of the network device. The network device includes a non-transitory computer-readable medium having stored therein a multicast protocol module, and a processor coupled to the non-transitory computer-readable medium. The processor is configured to execute the multicast protocol module. The multicast protocol module is configured to receive multicast data traffic for a multicast group of a quick change IPTV channel identified by the static group assigned to the loopback interface, and to discard the multicast data traffic for the multicast group of the quick change IPTV channel.

In one embodiment, a computing device is configured to execute a plurality of virtual machines for implementing network function virtualization (NFV), wherein a virtual machine from the plurality of virtual machines is configured to implement a method for providing a quick change Internet Protocol television (IPTV) service with reduced delay for transitioning to quick change IPTV channels by configuring a multicast client to a multicast group of the quick change IPTV channels. The multicast client is assigned to a loopback interface of a network device. The computing device includes a non-transitory computer-readable medium having stored therein a multicast protocol module, and a processor coupled to the non-transitory computer-readable medium. The processor is configured to execute the virtual machine. The virtual machine is configured to execute the multicast protocol module. The multicast protocol module is configured to receive multicast data traffic for a multicast group of a quick change IPTV channel identified by the static group assigned to the loopback interface, and to discard the multicast data traffic for the multicast group of the quick change IPTV channel.

In a further embodiment, a control plane device is configured to implement a control plane of a software defined networking (SDN) network including a plurality of network devices implementing the method for providing a quick change Internet Protocol television (IPTV) service with reduced delay for transitioning to quick change IPTV channels by configuring a multicast client to a multicast group of the quick change IPTV channels. The multicast client is assigned to a loopback interface of a network device. The control plane device includes a non-transitory computer-readable medium having stored therein a multicast protocol module, and a processor coupled to the non-transitory computer-readable medium. The processor is configured to execute the multicast protocol module. The multicast protocol module is configured to receive multicast data traffic for a multicast group of a quick change IPTV channel identified by the static group assigned to the loopback interface, and to discard the multicast data traffic for the multicast group of the quick change IPTV channel.

BRIEF DESCRIPTION OF THE DRAWINGS

The invention may best be understood by referring to the following description and accompanying drawings that are used to illustrate embodiments of the invention. In the drawings:

FIG. 4C illustrates various exemplary ways in which virtual network elements (VNEs) may be coupled according to some embodiments of the invention.

FIG. 4D illustrates a network with a single network element (NE) on each of the NDs of FIG. 8A.

FIG. 4E illustrates an example where each of the NDs implements a single NE (see FIG. 4D), but the centralized control plane has abstracted multiple of the NEs in different NDs into a single NE in one of the virtual network(s) of FIG. 4D, according to some embodiments of the invention.

FIG. 4F illustrates a case where multiple VNEs are implemented on different NDs and are coupled to each other, and where the centralized control plane has abstracted these multiple VNEs such that they appear as a single VNE within one of the virtual networks, according to some embodiments of the invention.

DETAILED DESCRIPTION

Figure 1:
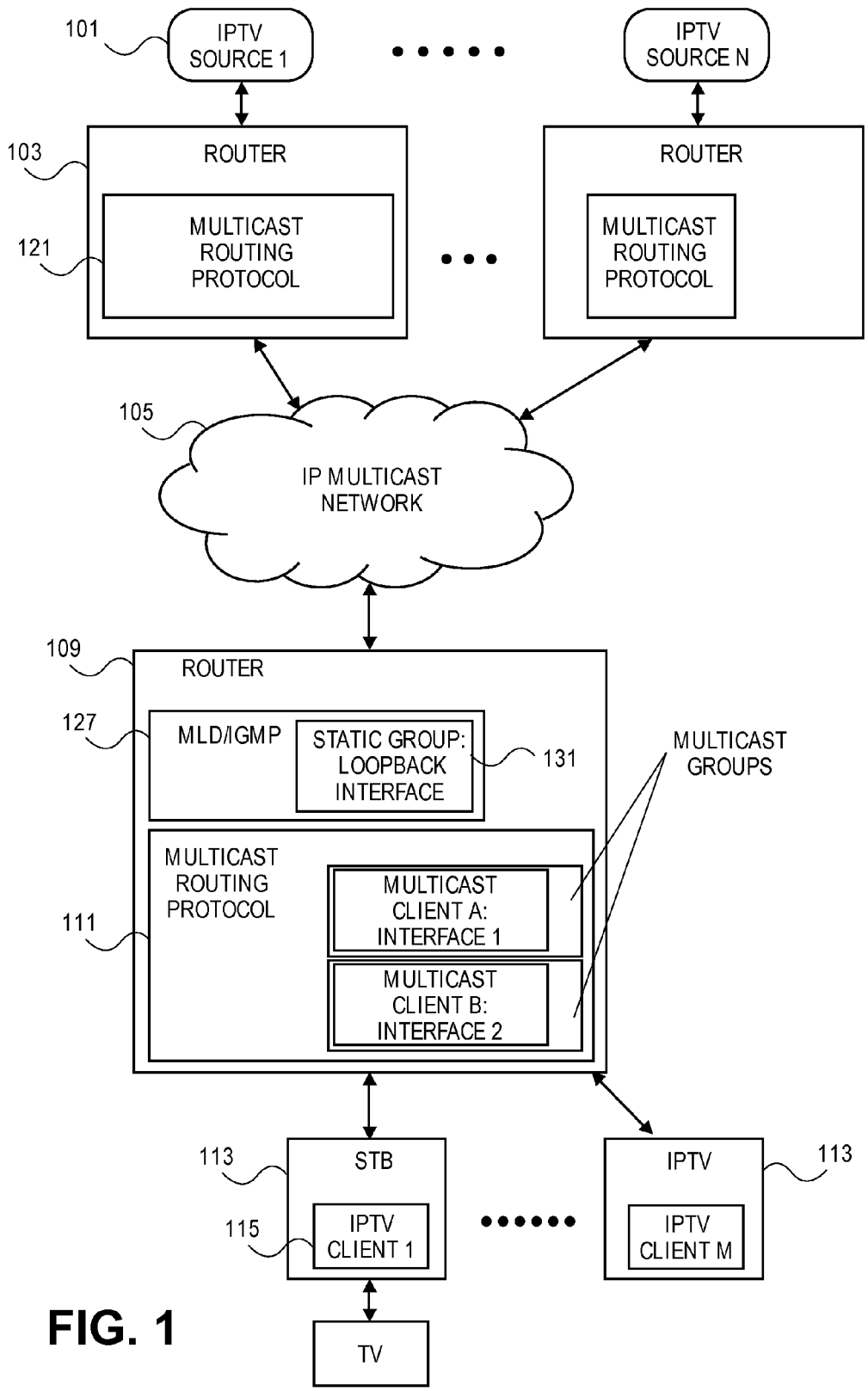
FIG. 1 is a diagram of one embodiment a multicast network for providing IPTV services.

The following description describes methods and apparatus for implementing a system for efficiently managing multicast memberships to enable a fast transition between IPTV channels at an IPTV. The process established quick IPTV channels by configuring edge routers in a multicast network to assign the multicast groups of the quick change IPTV channels to a static group such that the IPTV source and the multicast network forwards the data stream of the IPTV channel to the edge routers configured in this manner. In response to receiving an IGMP message from a set top box or IPTV to join the multicast group of the quick change IPTV channel the associated data stream can be forwarded to the joining set top box or IPTV channel with minimal delay because the data stream is already being sent to the local edge router and the delay associated with establishing the forwarding of the data stream to the router is avoided in cases where there are not subscribers for the IPTV channel at the local edge router and an initial subscriber joins the multicast group for the IPTV channel.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

IPTV services are a commonly used application of IP multicast technologies to provide television services to home and business subscribers. These home and business subscribers can have any number of televisions equipped with IPTV compatible set top boxes or televisions with built in support for IPTV services referred to simply as IPTVs. IPTV users watch and interact with IPTV services in the same manner as traditional television services provided over cable or satellite including watching television content on a channel by channel basis. IPTV users can select channels by inputting them into a set top box or an IPTV using the interfaces of those devices or a remote control. The IPTV users can thereby input a channel number or brows channels in sequence, using a channel guide or through a similar interface.

In response to the input or selection of a new IPTV channel at the IPTV or set top box, an IPTV client executed by the set top box or IPTV implements a process for obtaining the IPTV channel from an IPTV source via a multicast network administered by an IPTV provider or similar network provider. The IPTV client generates and sends an Internet Group Management Protocol (IGMP) membership report message to initiate the transmission of the IPTV channel to the set top box and/or the IPTV to enable a user to watch the IPTV channel. This membership report message is received by an edge router of the multicast network.

An IGMP module at the edge router shares the membership report information with multicast routing protocol like protocol independent multicast (PIM) to pull the data traffic of the IPTV source of the IPTV channel. When the IPTV user changes the IPTV channel again, another IGMP membership report is sent identifying the new IPTV channel and an IGMP leave message is sent as well by the IPTV client of the IPTV user. These messages identify sources by multicast addresses and provide addresses of the IPTV subscriber.

When an IPTV or setup box sends an IGMP membership report message with the multicast group address of the new IPTV channel in response to an IPTV user changing or selecting a new IPTV channel there can be a delay in providing the data stream of that IPTV channel. Depending on the complexity of the multicast network the time it takes to get the data stream to the set top box and/or the IPTV to display the IPTV channel to the IPTV user may take up to 3-5 seconds. This is not an acceptable level of delay to many users and is a significant delay in comparison to other television services like cable or satellite services. The main reason for the delay in pulling the data stream of a requested IPTV channel is the time necessary to update or establish a multicast tree to route the data stream of the data channel to the edge router serving the IPTV subscriber. For example, depending on the multicast protocol being utilized it takes time signal and update a multicast tree from a receiver designate router (DR) to a source DR. In a further example, if the multicast protocol is PIM-SIM, traffic flowing through a rendezvous point (RP) will also add time delay to build the multicast tree.

Thus the disadvantages of the prior art IPTV services addressed by the present embodiments of the invention are the significant delays in providing an IPTV source data stream in response to a change in IPTV channel selection by an IPTV subscriber. As noted above, most of the delay in displaying the IPTV channel to the IPTV user is due to delay in getting multicast traffic caused by establishing or updating a multicast tree associated with the IPTV channel. The delay increases proportionately based on the size of the network and/or if there is RP location in the multicast network, depending on the multicast protocols utilized.

The embodiments of the invention overcome these problems and disadvantages of the prior art through the use of a static IGMP group will be added on loopback interface for all the 'important' channels that is any channels identified to be quick change IPTV channels by an administrator or similar entity. The adding of the static group can in some instances increase bandwidth consumption in the multicast network or at a particular edge router and may impact other active IPTV channels. To avoid the impact on incoming active IPTV channels by inactive quick change IPTV channels, these static group entries on the loopback interface can be pre-emptible and can be dynamically reestablished based on bandwidth availability. This will be an important feature from the IPTV user point of view for faster IPTV channel selection. The embodiments of the invention thus provide an improved solution for an IPTV user to be able to view a quick change IPTV channel in a few hundreds of millionths of a second rather then 3-5 seconds provided in the prior art as discussed above. Thus, the quality of experience for the IPTV user is improved.

FIG. 1 is a diagram of one embodiment of a network implementing quick change IPTV channels. The network includes a set of IPTV sources 101. A 'set,' as used herein refers to any positive whole number of items including one item. The IPTV sources 101 can be a set of servers or similar computing devices that provide content such as standard television content in an IPTV channel format. The network can support any number of IPTV sources 101. The IPTV sources can be in communication with the network via a set of routers 103. The routers 103 can be directly connected to the IPTV sources 101 or indirectly in communication with the IPTV sources 101 through any number of intermediate computing or network devices. In the illustrated example, the IPTV sources are connected to the IP multicast network 105 through individual routers 103, however, in other embodiments the IPTV sources 101 can be multiply connected through more than one router 103.

Each of the edge routers 103 as well as any number of intermediate routers within the IP multicast network 105 implement a multicast routing protocol 111. The routers 103 and IP multicast network 105 can implement any set of multicast routing protocols including any one of or any combination of Internet Group Management Protocol (IGMP) for IPv4 or multicast listener discovery (MLD) for IPv6 between the edge router and an end user device, and protocol independent multicast (PIM), distance vector multicast routing protocol (DVMRP), or similar multicast protocols for delivery and/or distribution of multicast data over the IP multicast network. Depending on the multicast protocol each of the local edge routers 109 maintains a set of multicast groups identifying the multicast clients that belong to that multicast group. This multicast group also defines the set of interfaces that the multicast traffic is forwarded over toward the end subscriber. The local edge routers 109 instigate the creation of multicast distribution trees for each multicast group such that each node in the network is aware of the downstream interfaces that it is forwarding multicast traffic toward for each multicast group.

The IP multicast network 105 can be a network of any size or geographic distribution that implements an IP multicast routing protocol to enable the set of IPTV sources to be accessed by a set of end subscribers. The IP multicast network 105 can include any number of internal routers and edge routers 103. These routers connect any number of IPTV sources 101 or other sources to a set of set top boxes and/or IPTVs or similar end user devices belonging to end subscribers to the IPTV services. These end user devices 113 (i.e. set top boxes and IPTVs) can be connected through any number of local edge routers 109. In the illustrated example, each end user device is a connected to a single local edge router 109. However, one skilled in the art would understand that each of the end user devices can be multiply connected to any number of end user devices.

The local edge routers 109 facing the end user devices 113 can be any type of networking device implementing the multicast routing protocols of the IP multicast network 105. In one example embodiment, the multicast network implements PIM sparse mode (PIM-SM) and IGMP. The local edge routers 109 likewise PIM SM and IGMP. Thus, the local edge routers track which of the end user devices are multicast clients of each of the multicast groups. The local edge routers 109 can also be configured with a loopback interface. The loopback interface is not tied to any physical interface. Any traffic tied to this loopback interface is dropped at the local edge router 109. In the embodiments described herein, IPTV sources associated with IPTV channels to be handled as quick change IPTV channels are configured at these local edge routers 109 in a static group 131 tied to the loop back interface such that when there is not a multicast group corresponding to a designated quick change IPTV channels includes a multicast client associated with loopback interface. Thus, the IPTV multicast network configures a distribution tree to include each of these local edge routers 109 making the data traffic immediately available to any end user device 113 that joins the multicast group of the quick change IPTV channels.

End user devices 113 can include set top boxes such as console devices, network devices, and similar computing devices. Such end user devices 113 can be connected to televisions or displays for the viewing of content provided by IPTV channels. In other embodiments, the end user devices 113 are IPTVs with embedded computing devices. In either case, the end user devices 113 can execute an IPTV client 115 that implements the management of the communication of multicast messages to control the requests for IPTV channel content from the IP multicast network 105. The IPTV client 115 can interact with other control processes of the IPTV or the set top box to receive input that changes an IPTV channel setting. The delay in receiving IPTV channels designated and configured as quick change IPTV channels is significantly reduced from seconds to milliseconds with this architecture and process.

Figure 2:
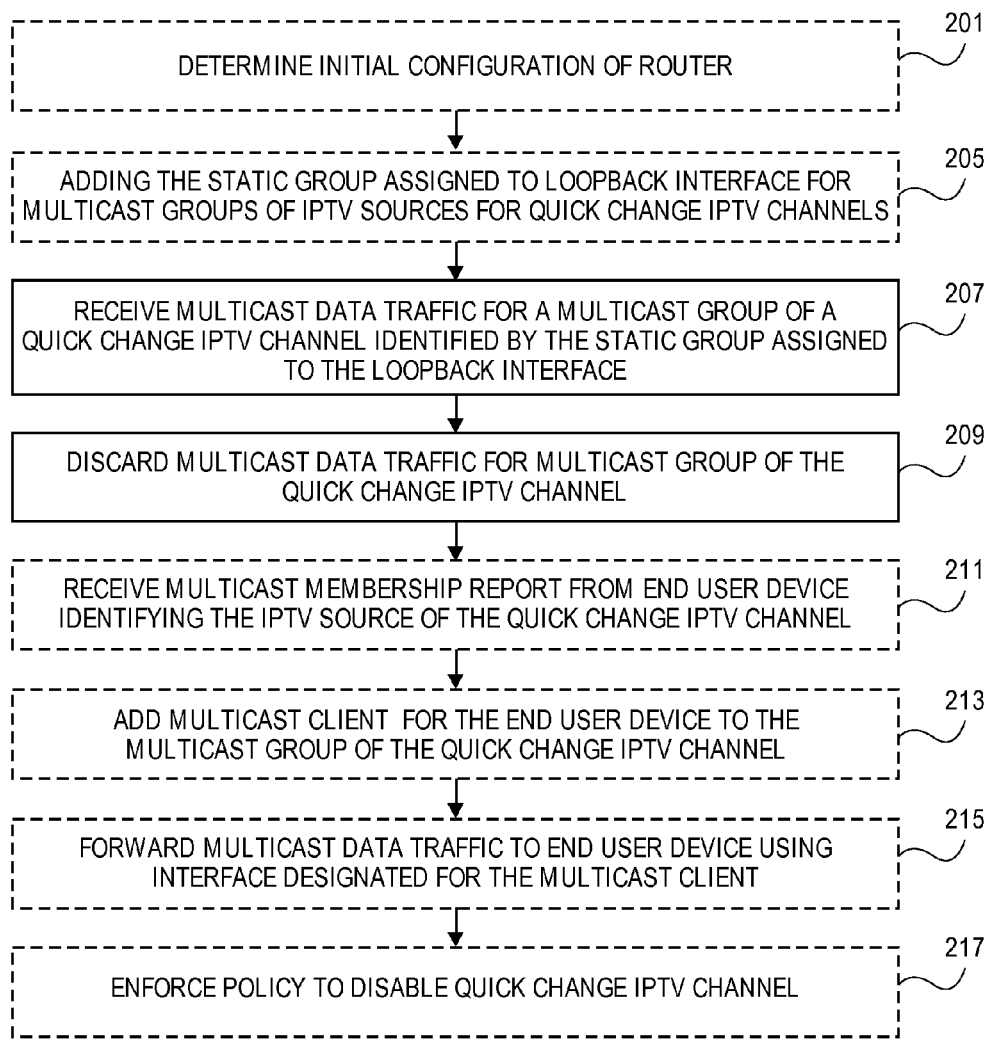
FIG. 2 is a diagram of one embodiment of a process for implementing a quick channel transition process for IPTV services.

FIG. 2 is a flowchart of one embodiment of the process for implementing quick change IPTV channels at the local edge router. In one embodiment, the process begins with the initialization of the network device implementing multicast routing, e.g., an edge router local to a set top box or IPTV executing an IPTV client that is requesting a quick change IPTV channel. The initialization includes a check for initial local edge router configuration (Block 201). In some embodiments, there may not be any initial multicast group configuration. All multicast group configuration may be done after initialization at a command line interface or similar user interface for configuring the network device or the multicast routing protocols. Similarly, there may be a previously configured static group information. Previously saved configurations and configurations from restarts are encompassed in the determination of the initial configuration of the local edge router.

In some embodiments, a static group can be added or configured by a user or administrator (Block 205). The static group can include a set of multicast group addresses associated with quick change IPTV channels. The quick change IPTV channels are tied to the static group and the static group is associated with the loopback interface. This process can be in parallel or as a part of the addition of the multicast clients to the multicast groups depending on the multicast protocols. The addition of a multicast address to the static group causes the multicast tree for distribution of the multicast group to include the local edge router and the data traffic for the quick change IPTV channels is then received at these local edge routers. However, the interface utilized is the loopback interface, which results in the data traffic of these IPTV channels being dropped, however the data traffic is quickly available if a multicast client joins the multicast group of the quick change IPTV channel at the local edge router.

With the configuration complete after the initialization of the local edge router, distribution of multicast traffic begins with the receipt of data traffic for each of the multicast groups that have multicast clients or that are associated with the static group (Block 209). Multicast traffic that is received is forwarded to the interfaces associated with each of the multicast groups maintained by the local edge router. This includes dropping data traffic by forwarding it to the loopback interface when a multicast group of a quick change IPTV channel does not include a multicast client assigned (Block 211). While data traffic is being received multicast membership reports or similar multicast join message can be received on any interface and identify any IPTV source (Block 213). This causes the multicast protocol to add a multicast client identifying the interface through which the report was received to at least one multicast group (Block 215). As a result multicast traffic is then forwarded toward this newly identified interface from the identified IPTV source (Block 217). However, the speed of this switch is dependent on the status of the multicast group. If the multicast group is for a quick change IPTV channel, then a multicast client is already ensured to be a member of the multicast group as it is part of a static group. This ensures that data traffic from that IPTV source is already being received at the local edge router and can be immediately forwarded to the new multicast client. If the identified IPTV source is not a quick change channel then the transition may be slower because the multicast protocol must promulgate this change across the multicast network such that the forwarding tree for that multicast group is updated to include the local edge router. This can cause a several second delay in receiving data traffic and therefore a slow response time at the IPTV when changing the channel.

In some embodiments, the local edge router can also be configured to enforce policies related to the usage of quick change IPTV channels (Block 217). A policy can be established to limit the bandwidth utilized by these quick change channels if it bandwidth availability falls below a threshold level at the local edge router or along a path associated with the local edge router. If such a policy is triggered the quick change IPTV channels can have their static groups over ridden to limit their bandwidth utilization. Similarly, if the bandwidth utilization falls back below a threshold then the static groups can be reinstated to enable the quick change IPTV process. Thus, the dynamic configuration of data traffic for quick change IPTV channels can be managed without adverse affect on other operations of the local edge router.

Architecture

Figure 3:
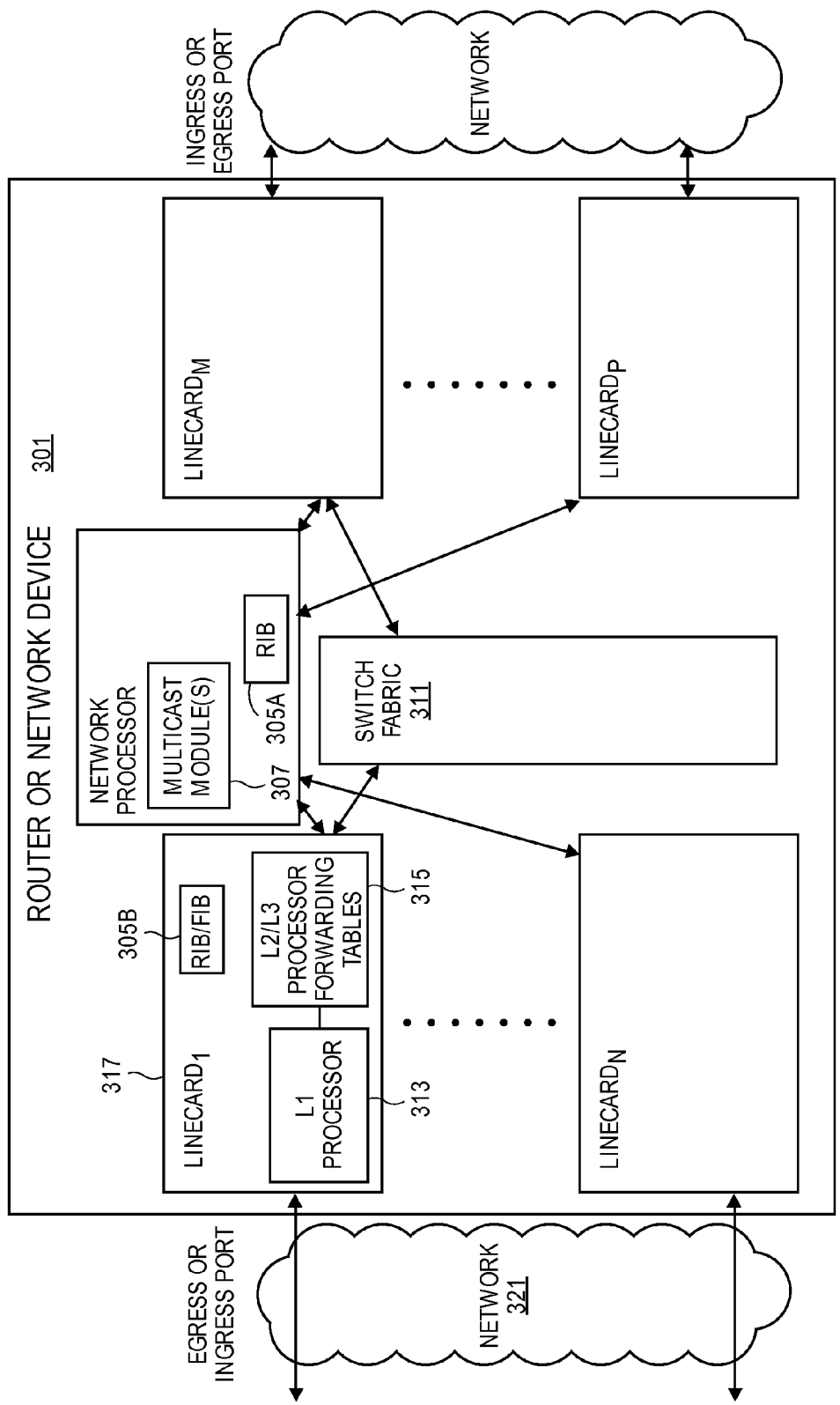
FIG. 3 is a diagram of one embodiment of a network device (ND) implementing a process for quick change IP channel configuration.

FIG. 3 is a diagram of one embodiment of a network device implementing the quick change IP channel process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the determination and configuration of quick change IP channels is implemented by a network device 301 or similar computing device. The network device 301 can have any structure that enables it to receive data traffic (e.g., multicast data traffic) and forward it toward its destination. The network device 301 can include a network processor 303 or set of network processors that execute the functions of the network device 301. A 'set,' as used herein, is any positive whole number of items including one item. The network device 301 can execute a set of multicast protocol modules 307 to implement the functions of configuring the network for proper handling of quick change IP channels forwarding of data packets across networks where the network device 301 functions as a node in this network as described herein above via a network processor 303.

The network device 301 connects with separately administered networks that have user equipment and/or content servers. The network processor 303 can implement the multicast protocol module(s) 307 as a discrete hardware, software module or any combination thereof. The network processor 303 can also service the routing information base 305A and similar functions related to data traffic forwarding and network topology maintenance. The routing information base 305A can be implemented as match action tables that are utilized for forwarding protocol data units PDUs (i.e. packets). The functions of the multicast protocol module(s)

307 can be implemented as modules in any combination of software, including firmware, and hardware within the network device. The functions of the multicast protocol module(s) 307 that are executed and implemented by the network device 301 include those described further herein above.

In one embodiment, the network device 301 can include a set of line cards 317 that process and forward the incoming data traffic toward the respective destination nodes by identifying the destination and forwarding the data traffic to the appropriate line card 317 having an egress port that leads to or toward the destination via a next hop. These line cards 317 can also implement the forwarding information base and/label forwarding base 305B, or a relevant subset thereof. The line cards 317 can also implement or facilitate the multicast protocol module(s) 307 functions described herein above. The line cards 317 are in communication with one another via a switch fabric 311 and communicate with other nodes over attached networks 321 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 301 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., an electronic signal, an optical signal, an electromagnet signal, a magnetic signal, an electric signal, a radio signal, a microwave signal, acoustic signal, or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 4A, 4B:
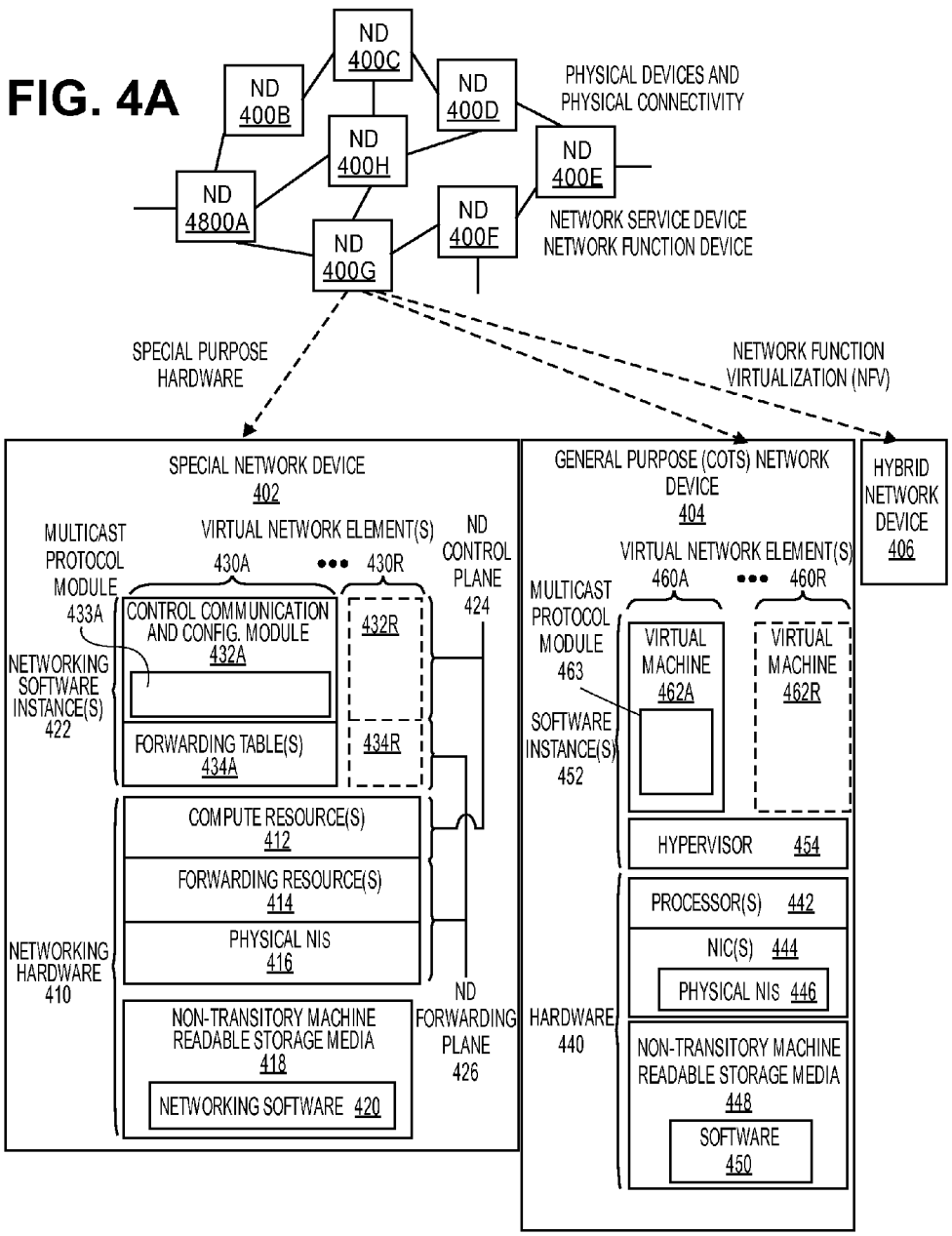
FIG. 4A illustrates connectivity between network devices (NDs) within an exemplary network, as well as three exemplary implementations of the NDs, according to some embodiments of the invention.
FIG. 4B illustrates an exemplary way to implement the special-purpose network device according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s)

422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A). In some embodiments, the control communication and configuration module 432A encompasses the multicast protocol module 433A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) (i.e. implemented as match action tables) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) are to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 804 includes hardware 840 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R. In some embodiments, the virtual machine 462A encompasses multicast protocol module(s) 463.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special-purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (as well as RSVP-Traffic Engineering (TE): Extensions to RSVP for LSP Tunnels, Generalized Multi-Protocol Label Switching (GMPLS) Signaling RSVP-TE) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R that are implementations of match action tables (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 806.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach). In some embodiments, the centralized reachability and forwarding information module 479 encompasses multicast group management and forwarding functions in multicast protocol module(s) 481 as described herein above.

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 486 thus enables the execution of applications that manage or interact with the functions associated with the network elements.

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
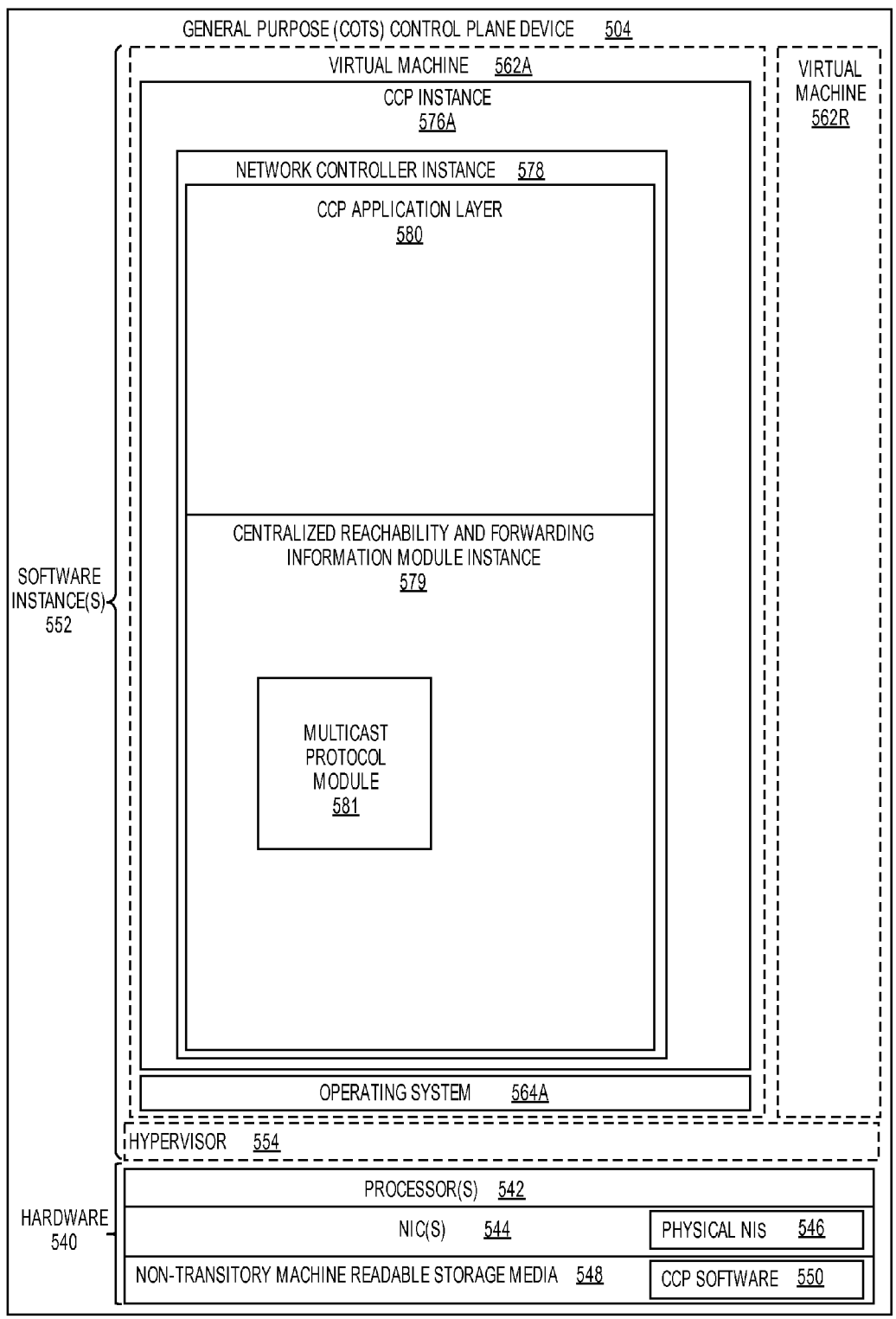
FIG. 5 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller instance 578 to the operating system 564A and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 976 works with virtual network view(s) (logical view(s) of the network) and the middleware layer provides the conversion from the virtual networks to the physical view. The CCP application can encompass the functionality of the multicast protocol module(s) 581 as described herein above.

The centralized control plane 576 transmits relevant messages to the data plane 680 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device for providing a quick change Internet Protocol television (IPTV) service with reduced delay for transitioning to quick change IPTV channels by configuring a multicast address of the IPTV channel to a static group, where the static group is assigned to a loopback interface of the network device, the method comprising the steps of:
   receiving multicast data traffic for a multicast group of a quick change IPTV channel, where the multicast group is associated with the static group that is assigned to the loopback interface for downstream traffic forwarding; and
   discarding the multicast data traffic for the multicast group of the quick change IPTV channel;
   the method further comprising:
   determining an initial configuration of the network device including multicast groups and static groups;
   adding the static group assigned to the loopback interface for multicast groups of IPTV sources for quick change IPTV channels; and
   enforcing a policy to disable the quick change IPTV channel, wherein the policy is a bandwidth limitation that disables the quick change IPTV channel to prioritize non-quick change IPTV channels, in response to the bandwidth limitation being exceeded at the network device.

2. The method of claim 1, further comprising:
   receiving a multicast membership report from an end user device identifying an IPTV source of the quick change IPTV channel;
   adding a multicast client for the end user device to the multicast group of the quick change IPTV channel; and
   forwarding multicast data traffic to the end user device using an interface designated for the multicast client.

3. The method of claim 2, wherein the multicast membership report is an Internet group management protocol (IGMP) message or a multicast listener discovery (MLD) message.

4. A network device for providing a quick change Internet Protocol television (IPTV) service with reduced delay for transitioning to quick change IPTV channels by configuring a multicast address of the IPTV channel to a static group, where the static group is assigned to a loopback interface of the network device, the network device comprising:
   a non-transitory computer-readable medium having stored therein a multicast protocol module; and
   a processor coupled to the non-transitory computer-readable medium, the processor configured to execute the multicast protocol module, the multicast protocol module configured to receive multicast data traffic for a multicast group of a quick change IPTV channel, where the multicast group is associated with the static group that is assigned to the loopback interface for downstream traffic forwarding, and to discard the multicast data traffic for the multicast group of the quick change IPTV channel;
wherein the multicast protocol module is further configured to determine an initial configuration of the network device including multicast groups and static groups, add the static group assigned to the loopback interface for multicast groups of IPTV sources for quick change IPTV channels, and enforce a policy to disable the quick change IPTV channel, wherein the policy is a bandwidth limitation that disables the quick change IPTV channel to prioritize non-quick change IPTV channels, in response to the bandwidth limitation being exceeded at the network device.

5. The network device of claim 4, wherein the multicast protocol module is further configured to receive a multicast membership report from an end user device identifying an IPTV source of the quick change IPTV channel, to add a multicast client for the end user device to the multicast group of the quick change IPTV channel and forward multicast data traffic to the end user device using an interface designated for the multicast client.

6. The network device of claim 5, wherein the multicast membership report is an Internet group management protocol (IGMP) message or a multicast listener discovery (MLD) message.

7. A computing device to execute a plurality of virtual machines for implementing network function virtualization (NFV), wherein a virtual machine from the plurality of virtual machines is configured to implement a method for providing a quick change Internet Protocol television (IPTV) service with reduced delay for transitioning to quick change IPTV channels by configuring a multicast client to a multicast group of the quick change IPTV channels, where the multicast client is assigned to a loopback interface of a network device, the computing device comprising:
a non-transitory computer-readable medium having stored therein a multicast protocol module; and
a processor coupled to the non-transitory computer-readable medium, the processor configured to execute the virtual machine, the virtual machine configured to execute the multicast protocol module, the multicast protocol module configured to receive multicast data traffic for a multicast group of a quick change IPTV channel, where the multicast group is associated with the static group that is assigned to the loopback interface for downstream traffic forwarding, and to discard the multicast data traffic for the multicast group of the quick change IPTV channel;
wherein the multicast protocol module is further configured to determine an initial configuration of the network device including multicast groups and static groups, add the static group assigned to the loopback interface for multicast groups of IPTV sources for quick change IPTV channels, and enforce a policy to disable the quick change IPTV channel, wherein the policy is a bandwidth limitation that disables the quick change IPTV channel to prioritize non-quick change IPTV channels, in response to the bandwidth limitation being exceeded at the network device.

8. The computing device of claim 7, wherein the multicast protocol module if further configured to receive a multicast membership report from an end user device identifying an IPTV source of the quick change IPTV channel, to add a multicast client for the end user device to the multicast group of the quick change IPTV channel and forward multicast data traffic to the end user device using an interface designated for the multicast client.

9. The computing device of claim 8, wherein the multicast membership report is an Internet group management protocol (IGMP) message or a multicast listener discovery (MLD) message.

10. A control plane device is configured to implement a control plane of a software defined networking (SDN) network including a plurality of network devices implementing the method for providing a quick change Internet Protocol television (IPTV) service with reduced delay for transitioning to quick change IPTV channels by configuring a multicast client to a multicast group of the quick change IPTV channels, where the multicast client is assigned to a loopback interface of a network device, the control plane device comprising:
a non-transitory computer-readable medium having stored therein a multicast protocol module; and
a processor coupled to the non-transitory computer-readable medium, the processor is configured to execute the multicast protocol module, the multicast protocol module configured to receive multicast data traffic for a multicast group of a quick change IPTV channel, where the multicast group is associated with the static group that is assigned to the loopback interface for downstream traffic forwarding, and to discard the multicast data traffic for the multicast group of the quick change IPTV channel, wherein the multicast protocol module is further configured to determine an initial configuration of the network device including multicast groups and static groups, add the static group assigned to the loopback interface for multicast groups of IPTV sources for quick change IPTV channels, and enforce a policy to disable the quick change IPTV channel, wherein the policy is a bandwidth limitation that disables the quick change IPTV channel to prioritize non-quick change IPTV channels, in response to the bandwidth limitation being exceeded at the network device.

11. The control plane device of claim 10, wherein the multicast protocol module if further configured to receive a multicast membership report from an end user device identifying an IPTV source of the quick change IPTV channel, to add a multicast client for the end user device to the multicast group of the quick change IPTV channel and forward multicast data traffic to the end user device using an interface designated for the multicast client.

12. The control plane device of claim 11, wherein the multicast membership report is an Internet group management protocol (IGMP) message or a multicast listener discovery (MLD) message.

\* \* \* \* \*